United States Patent
Almodovar Herraiz et al.

(10) Patent No.: US 8,442,503 B2
(45) Date of Patent: May 14, 2013

(54) PROXIMITY-TRIGGERED MESSAGING

(75) Inventors: Daniel Almodovar Herraiz, Madrid (ES); Jose Luis Cantarero Rodriguez, Reading (GB); Alberto Martin Briega, Madrid (ES)

(73) Assignee: Vodafone Group PLC, Newbury, Berkshire (GB)

(*) Notice: Subject to any disclaimer, the term of this patent is extended or adjusted under 35 U.S.C. 154(b) by 204 days.

(21) Appl. No.: 12/781,684

(22) Filed: May 17, 2010

(65) Prior Publication Data

US 2011/0009102 A1    Jan. 13, 2011

(30) Foreign Application Priority Data

May 18, 2009    (ES) .................................. 200930178

(51) Int. Cl.
H04M 3/42    (2006.01)

(52) U.S. Cl.
USPC .................. 455/414.2; 455/456.1; 455/456.3

(58) Field of Classification Search .......................... None
See application file for complete search history.

(56) References Cited

U.S. PATENT DOCUMENTS

| | | |
|---|---|---|
| 2006/0030333 A1 | 2/2006 | Ward et al. |
| 2010/0159904 A1* | 6/2010 | Colligan et al. ........... 455/414.2 |
| 2010/0291907 A1* | 11/2010 | MacNaughtan et al. ... 455/414.1 |

FOREIGN PATENT DOCUMENTS

| | | |
|---|---|---|
| EP | 1 868 164 | 6/2007 |
| WO | 2009/036497 | 3/2009 |

OTHER PUBLICATIONS

Extended European Search Report dated Nov. 29, 2010 issued in corresponding European Patent Application No. 10163011.9.

* cited by examiner

Primary Examiner — Rafael Pérez-Gutiérrez
Assistant Examiner — Suhail Khan
(74) Attorney, Agent, or Firm — Workman Nydegger

(57) ABSTRACT

System and method for enabling proximity-triggered messaging in certain coverage areas for social networks and communities-based services. The system includes at least one local unit with cellular radio transceiver, located within a corresponding coverage area. The cellular transceiver broadcasts a LAC different from any other LAC of the radio cells in the surroundings; establishes a Location Update dialogue with any mobile phone answering to the LAC broadcast, obtaining its IMSI number; sends a Location Updating Reject message to each mobile phone whose IMSI number has been obtained; and sends said IMSI number to a central unit. The central unit obtains, for each IMSI number, one valid identity in a community-based service; and provides at least one social network server associated to the corresponding valid on-line identity with the valid identity.

15 Claims, 1 Drawing Sheet

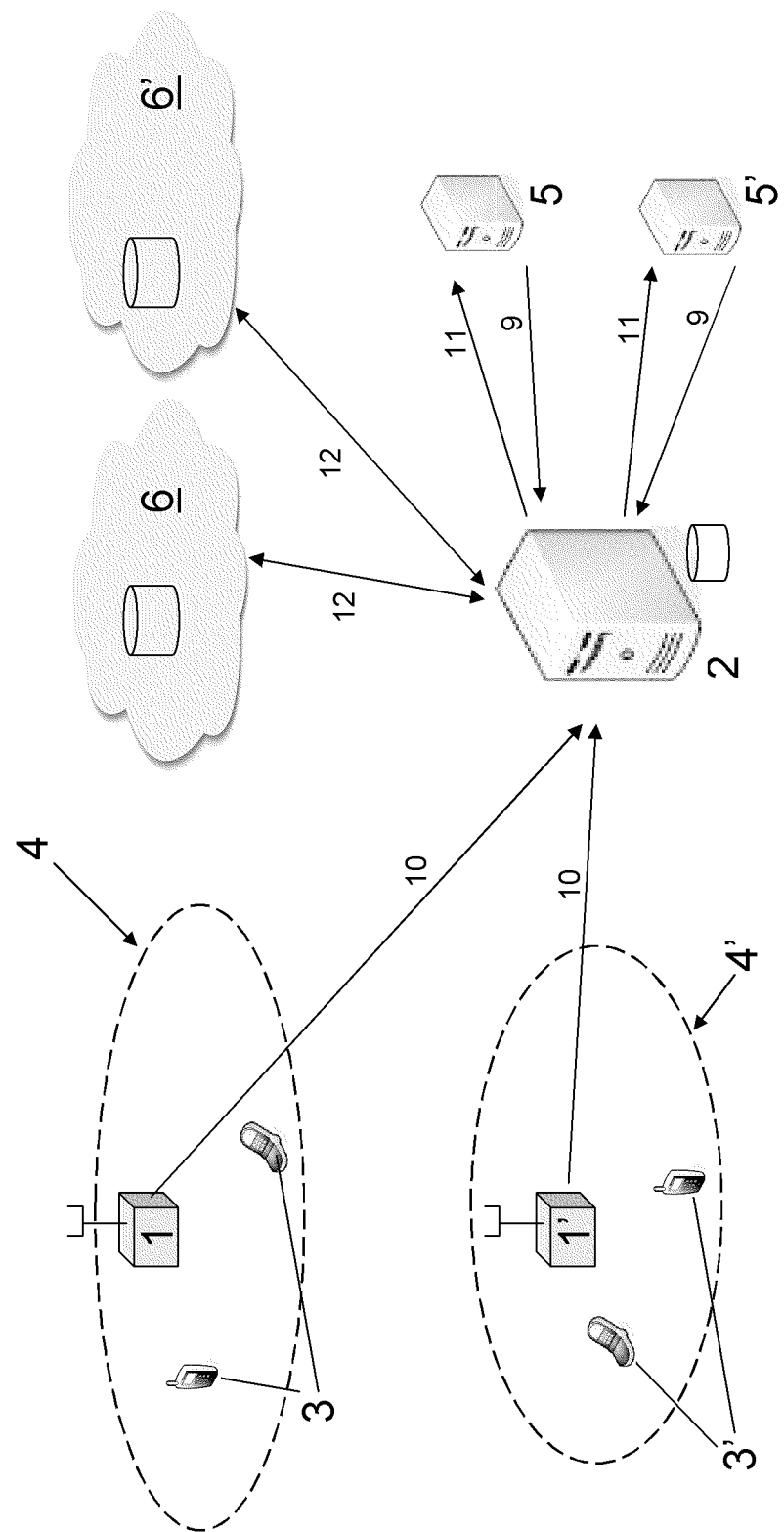

PROXIMITY-TRIGGERED MESSAGING

CROSS-REFERENCES AND RELATED APPLICATIONS

This application claims the benefit of the Spanish Patent Application No. ES P200930178, filed on May 18, 2009, which is hereby incorporated by reference in its entirety.

FIELD

Embodiments of the present invention pertain to the field of mobile communications, and more specifically in the provision of a system and method for enabling proximity-triggered messaging in certain coverage areas to users belonging to different social networks and/or communities-based services, provided they carry a switched-on mobile phone.

BACKGROUND

Social networks and communities are increasingly introducing location as an input to their services, e.g. showing the position of your buddies in a map or sending alerts when a buddy is near you. There are also community games in which location plays an essential role, e.g. geo-caching, a treasure hunt where you have to seek hidden containers. Besides, others services such as the 'virtual post-it', a message tied to a location that is visible only for those reaching that location, have already been suggested. The current problem lies in finding a perfect technical solution to enable this zone-centric messaging, because the existing solutions are neither scalable, accurate nor available to all devices.

The existing solutions are basically of two types:

Relative positioning, consisting in detecting the proximity of users via a short-range radio, especially Bluetooth® or WiFi. This requires the deployment of a local box but provides high accuracy.

Absolute positioning, using an absolute positioning method (e.g. GPS, cellular) that compares the user position with the geographical area of the target zone, detects the event of entering there, and then, triggers the delivery of messages to the device through the cellular channel. This solution does not require the deployment of a local box.

The existing relative positioning methods, based on Bluetooth or similar short range radio technologies, have a number of known drawbacks: not all mobile phones have the Bluetooth hardware, not all have it active (especially for saving battery), the discovery time can be high and the number of concurrent connections is low (generally only seven). Regarding the absolute positioning methods, the ones based on the cellular network are not accurate enough (cell resolution) and require a continuous polling or tracking of user's position that consumes network resources; and the ones based on the terminal (GPS) do not work indoors and require an internal process (local tracking) that consumes battery.

It is well-known that abbreviations and acronyms are frequently used in the mobile telephony field. Below is a glossary of acronyms/terms used throughout the present specification:

3GPP The 3rd Generation Partnership Project
BSC Base Station Controller
BTS Base Transceiver Station
GPS Global Positioning System
GSM Global System for Mobile Communications
HTTP Hyper Text Transfer Protocol
IMSI International Mobile Subscriber Identity
IP Internet Protocol
MAC Medium Access Control
MMS Multimedia Messaging Services
MSISDN Mobile Subscriber Integrated Services Digital Number
MSC Mobile Switching Centre
LAC Location Area Code
RNC Radio Network Controller
SGSN Serving GPRS Support Node
SMS Short Message Service
TIMSI Temporary International Mobile Subscriber Identity
UMTS Universal Mobile Telecommunications System
WAP Wireless Application Protocol

SUMMARY OF THE INVENTION

Embodiments of the proposed invention combine the advantages of the absolute positioning and the relative positioning methods discussed above. For example, a relative positioning method overcomes Bluetooth issues and delivers the messages through the cellular channel.

In addition, a relative positioning method addresses a number of other issues, including for example:
  continuous polling, which consumes network resources;
  continuous tracking at terminal, which consumes battery;
  the indoors coverage issue of GPS.

Relative positioning makes use of standard cellular channels instead of dedicated short-range radios such as Bluetooth, and thereby provides a number of advantages, including:
  elimination of a need for special hardware in the handset (it works with any standard cellular phone);
  no need for Bluetooth being active or of active phone connections (it works with phones in idle mode i.e. without active calls or data communications);
  lower impact in battery consumption (it has a low impact)

Further, delivery of messages through the cellular channel instead of through the short-range radio overcomes other known Bluetooth issues: very small number of simultaneous users (disclosed embodiments support a very high number of concurrent users).

By way of summary, embodiments of the present invention relate to methods and systems for obtaining the localization and sending messages to users belonging to different social networks provided they carry a switched-on mobile phone. Thus, disclosed embodiments relate to methods and systems for enabling proximity-triggered messaging in certain coverage areas for social networks and communities-based services.

An example embodiment is comprised of:

1. A transmitting and receiving function performed by a local unit that uses standard cellular mechanisms (similar to the ones in existing BTS and BSC/RNC). It broadcasts system information with a certain LAC (Location Area Code), forces all mobile phones of the same network within its reach area to send a Location Update message, captures the identity (e.g. IMSI) of those phones and sends back a Location Update reject message to avoid further disturbing the phones. The radiation pattern of the antenna system can be modified to shape the coverage area convenient to the particular use case.

2. A social Enabler Server or central unit, typically centralised at the network and whose main functions are collecting the captured identities (IMSI), translating them into valid identity for the community-based services (e.g. riddick@planet-hunting-com) and triggering the associated event (i.e. location+identity) to the community-based servers. Then, the community-based services will act accordingly (e.g. sending an SMS to the user with the clue to find the next place), depending of the configuration of the actual service (e.g. geo-caching game plot, virtual notice board, chatting). The behaviour of those systems once they have received the trigger not discussed herein. Disclosed embodiments are directed to the system and method for producing that trigger and to associate a valid identity that allows the social networks systems to address the user via Internet (online identity) or via the regular cellular channel (e.g. SMS, MMS, WAP Push) in case the MSISDN is known.

In a disclosed method, steps are disclosed for enabling proximity-triggered messaging in certain coverage areas for social networks and communities-based services. For example, steps include:
  broadcasting, in the licensed spectrum of at least one mobile network operator and from at least one local unit, each one located within a corresponding coverage area, a LAC different from any other LAC of the radio cells of the mobile network in the surroundings;
  establishing each local unit a Location Update dialogue with any mobile phone answering to the LAC broadcast, obtaining from each answering mobile phone its IMSI number;
  sending each local unit a Location Updating Reject message to each mobile phone whose IMSI number has been obtained;
  sending each local unit the IMSI number of each answering mobile phone to a central unit;
  obtaining, for each IMSI number, at least one valid identity in a community-based service;
  providing at least one social network server associated to the corresponding valid on-line identity with the event composed of the valid identity plus the location and time where and when it was obtained.

The valid identity of a community-based service can include: MSISDN (i.e. phone number), email account, account of the user in the community-based service, identity token known by the community-based service.

The coverage area of the at least one local unit can be configurable through at least one of the following parameters:
  the transmission power to modify the reach;
  the radiation pattern of the antenna system to modify the shape of the coverage area,
  the system information parameters that the regular cells in the mobile network are broadcasting to all mobile phones.

The step of obtaining, for each IMSI number, the at least one valid identity in a community-based service can comprise retrieving said valid identity corresponding to said IMSI number from a corresponding mobile operator or retrieving it from a database linked to the community-based service.

The broadcasting of the at least one local unit can be carried out at the same time in spectrum of different radio technologies of the same mobile network operator or at the same time in spectrum of different mobile operators, the central unit managing the identities captured for the mobile phones of those said mobile operators.

Disclosed embodiments also include a system for enabling proximity-triggered messaging in certain coverage areas for social networks and communities-based services. In one example, the system comprises:
  at least one local unit provided with cellular radio transceiver means for transmitting and receiving signals in the licensed spectrum of at least one mobile network operator, each local unit being located within a corresponding coverage area, and being configured for:
    broadcasting a LAC different from any other LAC of the radio cells of the mobile network in the surroundings;
    establishing a Location Update dialogue with any mobile phone answering to the LAC broadcast, obtaining from each answering mobile phone its IMSI number;
    sending a Location Updating Reject message to each mobile phone whose IMSI number has been obtained;
    sending said IMSI number to a central unit;
  the central unit, configured to:
    obtain, for each IMSI number, at least one valid identity in a community-based service;
    provide at least one social network server associated to the corresponding valid on-line identity with the event composed of the valid identity plus the location and time where and when it was obtained.

The at least one local unit can comprise means for configuring the at least one of the following parameters that determines its corresponding coverage area:
  the transmission power to modify the reach;
  the radiation pattern of the antenna system to modify the shape of the coverage area;
  the system information parameters that the regular cells in the mobile network are broadcasting to all mobile phones.

In one embodiment the central unit can be remote to the at least one local unit and configured for remotely managing the at least one local unit.

The central unit can be configured to, for each IMSI number received, retrieve the identity corresponding to said IMSI number from a corresponding mobile operator or from a database linked to the community-based service.

The at least one local unit can be further configured to carry out the broadcasting at the same time in spectrum of different radio technologies of the same mobile network operator or at the same time in spectrum of different mobile operators, being the central unit configured to manage the identities captured for the mobile phones of those said mobile operators.

BRIEF DESCRIPTION OF THE DRAWINGS

To complete the description and, in order to provide for a better understanding of the invention, a set of drawings is provided. Said drawings form an integral part of the description and illustrate example embodiments of the invention, which should not be interpreted as restricting the scope of the invention, but just as examples of how the invention can be embodied. The drawings comprise the following FIGURES:

FIG. 1 shows a basic diagram of an example system of the invention.

DETAILED DESCRIPTION OF THE PREFERRED EMBODIMENTS

The example system, represented schematically in FIG. 1, is composed of at least one local unit (1,1') and a social enabler server, central unit 2, local or remote to the previous one.

The local unit (1,1') has the following function:
An identity capture function that uses standard cellular mechanisms (similar to the ones in existing BTS and BSC/RNC). It broadcasts system information with a certain LAC (Location Area Code), forcing the mobile phones (3,3') of the same network within its reach area, the coverage area (4,4'), to send a Location Update message. It captures then the identity (e.g. IMSI) of those phones (3,3') and sends back a Location Update reject message to avoid further disturbing the phones (during a certain period chosen by the operator or until they are switched off). The identity capture function sends 10 the captured identity to the central unit 2. The radiation pattern of the antenna system can be modified to shape the coverage area (4,4') convenient to the particular use case. The identity capture function can use all the radio technologies of a mobile operator in case there are several technologies active (e.g. GSM and UMTS).

The central unit 2, typically in the network and involving the participation of one or several mobile operators (6,6'), one or several community-based service providers or social network servers (5,5') (e.g. social networking, geo-gaming, geo-messaging within a group) and optionally an aggregator (i.e. a specific party that would behave as broker or dealer between the multiple parties).

The central unit 2 collects the captured identities from different local units (1,1'). This collector function could perform the remote management of the local units as well (e.g. triggering alerts when the local units are down, changing their operating parameters, etc.). Besides, it could support a multi-operator scenario, aggregating the captures obtained from local units (1,1') radiating in the spectrum of different mobile operators of that country or region.

A task or function of this central unit 2 is the identity management, in order to associate and convert the captured IMSI identity (a cellular identity corresponding to lower layers, similarly to Ethernet MAC address in IP networks or Bluetooth MAC in Bluetooth networks) into a valid identity in the community-based services (e.g. Facebook account, SecondLife account, e-mail account, SIP URI or a hashed token known by the social networks service). This would require databases, with the proper provision, query and authentication mechanisms. The telephony identity (MSISDN, i.e. phone number) obtained via request 12 to the corresponding mobile operator (6,6'), which will consult its HLR, may or not may be used in this function. If used, as it is likely to happen in most of the cases, it could serve as an intermediate means to convert IMSI to a valid on-line identity of a community-based service or as a means to send messages to the social members via the cellular channel (SMS, MMS, WAP Push). If not used, it would require the direct translation of IMSIs to the community-based identity. This could be feasible if every user provisions his own IMSI in the social network systems (e.g. when signing up)—having previously obtained that IMSI value via a SIM card reader and specific software.

Once the identity conversion is completed, the central unit 2 triggers 11 the proximity-based events to the associated community-based services, which normally will have made a previous request 9 to the central unit 2 to join the service it provides. The protocol used for requests and event reporting will typically be a web service using lightweight HTTP-based protocols, in order to ease the task of the web developers. The proximity-based events is composed of the identity plus the location and time where and when it was obtained.

The actions performed by the community-based services (i.e. what they do with the triggers) is beyond the scope of this disclosure, and would vary depending on the application. For instance, a geocaching service could send to the user detected in the local unit an e-mail containing the clue to solve the next challenge and find the next place; a chatting service based on a location (e.g. club venue, pub) could indicate to the active members that a new user has entered the location, etc. The channel for the communication back to the user could be the Internet, through the online identity, or the cellular network (e.g. SMS, MMS, phone call), though the MSISDN if known.

The function for capturing cellular identities (identity capture function) must always include a unit local to the venue (e.g. street, public place) for radio transmissions and besides may have part of its functionality located remotely in the network. This function replicates a standard cellular mechanism for the dialogue with mobile phones within its reach. In particular, this local unit broadcasts specific system information as if it was a BTS (base station) and forces a Location Update message by all mobile phones within its reach belonging to its cellular network. Then, the function captures the identity of those phones, such as the IMSI, and rejects the Location Update attempts, hence not disturbing the mobile phones further. This behaviour is based on well-known standard cellular procedures for GSM and UMTS and the local unit 1 can be built based on existing picocell or femtocell technology with a very low cost (e.g. below 200 euros). Location Update procedures are described in detail in ETSI 123 909 V4.0.0 (2001 March)—a technical report from the European Telecommunications Standards Institute (ETSI)—and 3GPP TS 23.012, from the 3rd Generation Partnership Project, the contents of which are hereby incorporated by reference.

Additional example details of this identity capture function are described here:

- The identity capture function (composed of the local unit plus optionally some intelligence in network systems) implements a small subset of the functionality of a BTS, BSC/RNC and MSC/SGSN, in particular the one described below.
- The local unit 1 transmits and receives in the licensed spectrum of a mobile network operator. This local unit 1 broadcasts system information in the radio interface towards the mobile phones using the standard procedures and channels for that purpose. As part of its Cell Global Identity, this unit broadcasts a LAC (Location Area Code) that is different from any LAC of the real cells of the mobile network in the surroundings (e.g. the operator can book special Location Area Codes for the road usage charging service).
- Due to the standard behaviour in any mobile phone, when a phone detects for the first time this Location Area Code because it enters under coverage of the unit, the mobile phone will initiate a Location Update dialogue with the unit.
- The identity capture function (local unit and/or network systems) will respond to that dialogue and, again following standard procedures, will force the phone to provide its IMSI number (note that even if the phone answers first with the TIMSI number, which is a temporal identity, the function can still request the phone to provide the IMSI number).
- Once obtained the IMSI number, the function will finish the dialog sending a Location Updating Reject message to the phone with a rejection cause that will make the phone not trying again a Location Update dialog with the function during a known timer (e.g. 2 hours) or as long as the phone keeps switched on (depending on the chosen rejection cause). This means that the mobile phone will ignore the radio transmissions of the local unit from this moment on and will not try to connect with it even it is still under the coverage of the unit, unless the period expires or the phone is switched off and switched on again within that coverage.

Finally, for every mobile phone captured, this function will send the IMSI number to the central unit 2, typically via user plane (i.e. IP connection).

The coverage area (4,4') of the local unit (1,1') can be typically configured based on two aspects specific to the local unit: first, the transmission power, which determines the reach; second, the features of the antenna system (e.g. radiation pattern, gain, downtilt), which determine the shape of the coverage. In addition, the system information parameters that the regular cells in the mobile network are broadcasting to all mobile phones can be also relevant to determine the coverage of the local unit. All aspects can be statically or dynamically modified to shape a particular area that is convenient to the communities and social networks scenario, e.g. university campus, stage in a music festival.

The operating parameters of the unit (e.g. Location Area Code, transmitting power, antenna system) could be configured locally or remotely via a typical remote Operation & Maintenance system (e.g. based on IP protocols).

As mentioned before, this function for capturing identities could be entirely local (i.e. all the procedure replicating BTS, BSC/RNC and MSC/SGSN can be managed by the local unit, acting standalone) or can be a combination of local unit plus network equipment (some parts or the procedure done locally and others remotely). In any case, a local unit is always required for radio transmissions.

The local unit can be fixed (e.g. installed in a street light) or mobile (e.g. installed in a bicycle or in a car that takes part of a hunting game).

In case of a multi-operator scenario, some parts of the unit should be duplicated per operator whereas others can be shared (e.g. antenna system).

In terms of physical equipment, in a typical installation there would be local units located at the areas where people have to be detected and one or several central units at the network.

The invention claimed is:

1. A method for enabling proximity-triggered messaging in certain coverage areas for social networks and communities-based services, the method comprising:
    broadcasting, in a licensed spectrum of at least one mobile network operator and from at least one local unit, where each local unit is located within a corresponding coverage area, a Location Area Code (LAC) different from any other LAC broadcast by another element that is different from the local unit of radio cells of a mobile network of the at least one mobile operator in a surrounding area of the local unit;
    establishing at each local unit, a Location Update dialog with each mobile phone answering to the LAC broadcast from each local unit;
    obtaining, from each answering mobile phone for each local unit, at the local unit, an International Mobile Subscriber Identity (IMSI) number of the mobile phone;
    sending, from each local unit, a Location Updating Reject message to each answering mobile phone for which the local unit has obtained the IMSI number, the Location Updating Reject message including information that causes each answering mobile phone to ignore the local unit for a specified amount of time;
    sending, from each local unit, the IMSI number of each answering mobile phone to a central unit;
    obtaining, for each IMSI number sent to the central unit from the at least one local unit, at least one valid identity for a community-based service for each answering mobile phone; and
    providing to at least one social network server associated with the community-based service the corresponding valid identity for each answering mobile phone along with an event composed of the valid identity plus a location and a time where and when the valid identity was obtained.

2. The method according to claim 1, wherein the valid identity of a community-based service is any of the following:
    Mobile Subscriber Integrated Services Digital Number (MSISDN), email account,
    account of a user in the community-based service,
    identity token known by the community-based service.

3. The method according to claim 1, wherein the coverage area of the at least one local unit is configurable through at least one of the following parameters:
    a transmission power to modify a reach;
    a radiation pattern of the antenna system to modify a shape of the coverage area, and
    a system information parameters that regular cells in the mobile network are broadcasting to all mobile phones.

4. The method according to claim 1, wherein the step of obtaining, for each IMSI number sent to the central unit from the at least one local unit, the at least one valid identity in a community-based service comprises retrieving said valid identity corresponding to said IMSI number from a corresponding mobile operator.

5. The method according to claim 1, wherein the step of obtaining, for each IMSI number, the at least one valid identity for the community-based service comprises retrieving said valid identity corresponding to said IMSI number from a database linked to the community-based service.

6. The method according to claim 1, wherein the broadcasting of the at least one local unit is carried out at the same time in spectrum of different radio technologies of the same mobile network operator.

7. The method according to claim 1, wherein the broadcasting of the at least one local unit is carried out at the same time in spectrum of different mobile operators, the central unit managing the identities captured for the mobile phones of those said mobile operators.

8. A system for enabling proximity-triggered messaging in certain coverage areas for social networks and communities-based services, the system comprising:
    at least one local unit provided with a cellular radio transceiver for transmitting and receiving signals in a licensed spectrum of at least one mobile network operator, each local unit being located within a corresponding coverage area, and being configured to:
    broadcast a Location Area Code (LAC) different from any other LAC broadcast by another element that is different from the local unit of radio cells of a mobile network of the at least one mobile operator in a surrounding area of the local unit;
    establish a Location Update dialogue with each mobile phone answering to the LAC broadcast from the local unit;
    obtain, from each answering mobile phone for each local unit, at the local unit, an International Mobile Subscriber Identity (IMSI) number of the mobile phone;
    send a Location Updating Reject message to each answering mobile phone for which the local unit has obtained the IMSI number, the Location Updating Reject message including information that causes each answering mobile phone to ignore the local unit for a specified amount of time; and
    send said IMSI number of each answering mobile phone to a central unit;

wherein the central unit is configured to:
obtain, for each IMSI number received from the local unit, at least one valid identity for a community-based service for each answering mobile phone;
provide to at least one social network server associated with the community-based service the corresponding valid identity for each answering mobile phone along with an event composed of the valid identity plus a location and a time where and when the valid identity was obtained.

9. The system according to claim 8, wherein the valid identity of a community-based service is any of the following:
Mobile Subscriber Integrated Services Digital Number (MSISDN), email account,
account of a user in the community-based service,
identity token known by the community-based service.

10. The system according to claim 8, wherein the at least one local unit is implemented for configuring at least one of the following parameters that determines the corresponding coverage area of the local unit:
a transmission power to modify the reach;
a radiation pattern of the antenna system to modify the shape of the coverage area;
a system information parameters that regular cells in the mobile network are broadcasting to all mobile phones.

11. The system according to claim 8, in which the central unit is remote to the at least one local unit, wherein the central unit is configured for remotely managing the at least one local unit.

12. The system according to claim 8, wherein the central unit is configured to, for each IMSI number received, retrieve the identity corresponding to said IMSI number from a corresponding mobile operator.

13. The system according to claim 8, wherein the central unit is further configured, when obtaining for each IMSI number at least one valid identity in a community-based service, to retrieve said valid identity corresponding to said IMSI number from a database linked to the community-based service.

14. The system according to claim 8, wherein the at least one local unit is configured to carry out the broadcasting at the same time in spectrum of different mobile operators, the central unit being configured to manage the identities captured for the mobile phones of those said mobile operators.

15. The system according to claim 8, wherein the at least one local unit is configured to carry out the broadcasting at the same time in spectrum of different radio technologies of the same mobile network operator.

* * * * *